United States Patent
Hsu et al.

(10) Patent No.: US 7,072,622 B2
(45) Date of Patent: Jul. 4, 2006

(54) SIGNAL PROCESSING METHOD FOR A WALKIE-TALKIE DEVICE

(75) Inventors: Jany-Yee Hsu, Yun-Lin Hsien (TW); Chau-Kai Hsieh, Hsin-Chu Hsien (TW)

(73) Assignee: Conwise Technology Corporation Ltd., Hsin-Chu (TW)

(*) Notice: Subject to any disclaimer, the term of this patent is extended or adjusted under 35 U.S.C. 154(b) by 462 days.

(21) Appl. No.: 10/249,151

(22) Filed: Mar. 19, 2003

(65) Prior Publication Data

US 2004/0203511 A1 Oct. 14, 2004

(30) Foreign Application Priority Data

Oct. 24, 2002 (TW) ............................... 91124843 A (51) Int. Cl.
*H04B 1/38* (2006.01)

(52) U.S. Cl. .................... 455/90.2; 455/41.2; 455/11.1; 455/563; 455/552.1; 340/573.1; 340/539.1; 340/573.4

(58) Field of Classification Search ............... 455/41.2, 455/11.1, 563
See application file for complete search history.

(56) References Cited

U.S. PATENT DOCUMENTS

| | | | | | |
|---|---|---|---|---|---|
| 5,748,669 | A | * | 5/1998 | Yada | 375/135 |
| 5,784,002 | A | * | 7/1998 | Roehr | 340/825.5 |
| 5,790,593 | A | * | 8/1998 | Taal | 375/222 |
| 5,812,951 | A | * | 9/1998 | Ganesan et al. | 455/445 |
| 6,101,376 | A | * | 8/2000 | Bell | 455/218 |
| 6,115,414 | A | * | 9/2000 | Taal | 375/220 |
| 6,202,050 | B1 | * | 3/2001 | Chen | 704/275 |
| 6,289,218 | B1 | * | 9/2001 | Liu | 455/426.1 |
| 6,584,306 | B1 | * | 6/2003 | Mirabelli | 455/347 |

FOREIGN PATENT DOCUMENTS

CN 2508502 Y 8/2002

* cited by examiner

*Primary Examiner*—Marceau Milord
(74) *Attorney, Agent, or Firm*—Winston Hsu (57) ABSTRACT

A walkie-talkie device applies a continuous tone-coded squelch system (CTCSS) to control signal transmission. The walkie-talkie device has an analog-to-digital converter, a digital signal processor, and a digital-to-analog converter. The signal processing method includes using the analog-to-digital converter to convert a first analog signal into a first digital signal, using the digital signal processor to handle a CTCSS tone related to the first digital signal for generating a second digital signal, and using the digital-to-analog converter to convert the second digital signal into a second analog signal. The walkie-talkie device uses the CTCSS tone to discriminate a required speech signal from other speech signals transmitted by the same physical channel.

10 Claims, 5 Drawing Sheets

SIGNAL PROCESSING METHOD FOR A WALKIE-TALKIE DEVICE

BACKGROUND OF INVENTION

1. Field of the Invention

The present invention relates to a signal processing method of a walkie-talkie device, and more particularly, to a signal processing method with digital signal processing used for filtering signals.

2. Description of the Prior Art

Figure 1:
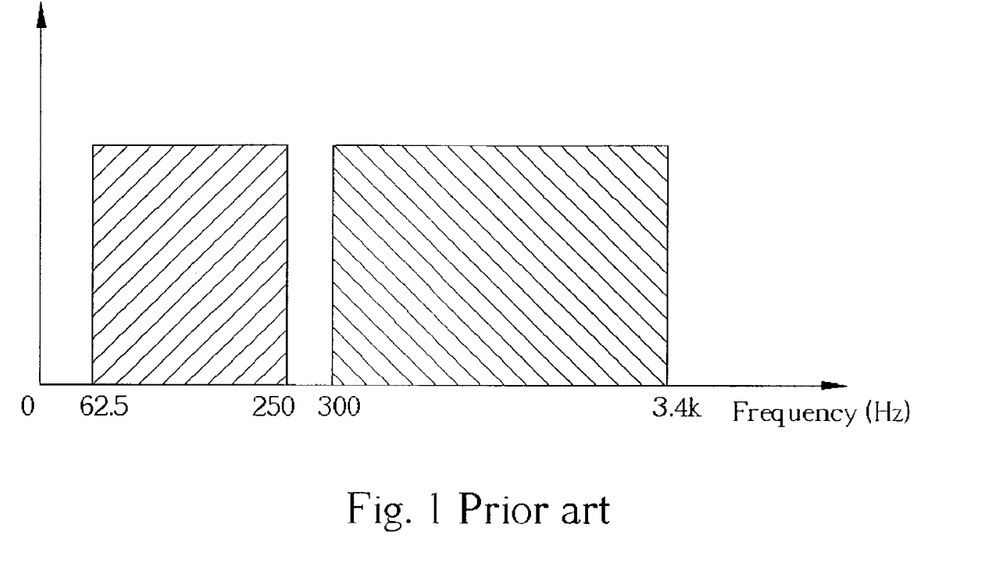
FIG. 1 is a schematic diagram showing frequency bands used by the prior art CTCSS.

A continuous tone-coded squelch system (CTCSS) has been widely applied to wireless transmission, and is used to make a plurality of users communicate with each other within a predetermined communication area. The CTCSS adopts a low-frequency CTCSS tone signal to distinguish signals transmitted via the same physical channel. For instance, a prior art walkie-talkie device utilizes the CTCSS to achieve group communication. Please refer to FIG. 1, which is a schematic diagram showing frequency bands used by the prior art CTCSS. As shown in FIG. 1, a band ranging from 62.5 Hz to 250 Hz is used to transmit the above-mentioned low-frequency CTCSS tone signal, and another band ranging from 300 Hz to 3.4 KHz is used to transmit speech signals spoken by a user. The operation of the CTCSS is described as follows. With regard to the prior art walkie-talkie device, 14 channels $P_1$~$P_{14}$ generally are adopted to carry signals, and the 14 channels are physical channels. In addition, 38 CTCSS tone signals $T_1$~$T_{38}$ individually corresponding to different frequencies are used. One of the 38 CTCSS tone signals $T_1$~$T_{38}$ annexed to one physical channel generates a specific logical channel, and the 14 physical channels are capable of forming 532 (14*38) logical channels in total. When a speaker sets the walkie-talkie device with a physical channel $P_1$ and a desired CTCSS tone signal $T_1$, that is, the logical channel set by the speaker becomes $P_1$ ($T_1$) After the speaker presses a push-to-talk (PTT) button on the walkie-talkie device, the speaker is capable of outputting speech signals via the walkie-talkie device toward the predetermined communication area specified by the walkie-talkie device. If there are three listeners in the predetermined communication area, and the three listener set their own logical channels as $P_1$ ($T_1$) $P_1$ ($T_{38}$), $P_2$ ($T_1$) respectively. For the first listener with a logical channel $P_1$ ($T_1$) because his walkie-talkie device receives and transmits signals through the physical channel $P_1$, the walkie-talkie device of the first listener will start receiving speech signals spoken by the speaker. In addition, the walkie-talkie device of the first listener judges that the CTCSS tone signal used by the speaker is $T_1$. In other words, the speaker and the first listener both adopt the same logical channel $P_1$ ($T_1$). Therefore, the walkie-talkie device of the first listener then outputs the received speech signals via an audio speaker. The first listener is capable of hearing the speech signals spoken by the speaker. For the second listener with a logical channel $P_1$ ($T_{38}$) because his walkie-talkie device receives and transmits signals through the physical channel $P_1$, the walkie-talkie device of the second listener will start receiving speech signals spoken by the speaker. However, the walkie-talkie device of the second listener judges that the CTCSS tone signal used by the speaker is not $T_1$, but $T_{38}$. In other words, the speaker and the second listener adopt different logical channels $P_1$ ($T_1$) and $P_1$ ($T_{38}$). Therefore, the walkie-talkie device of the second listener then does not output the received speech signals via an audio speaker. The second listener cannot hear the speech signals spoken by the speaker. For the third listener with a logical channel $P_2$ ($T_1$), because his walkie-talkie device receives and transmits signals through the physical channel $P_2$, the walkie-talkie device of the third listener and that of the speaker use different physical channels. With the unmatched physical channel, the walkie-talkie device of the third listener cannot acknowledge an adequate signal strength indicated by a received signal strength indicator (RSSI). Therefore, the walkie-talkie device of the third listener will not receive any speech signals spoken by the speaker. That is, no speech signal is played by an audio speaker of the walkie-talkie device. The second and third listeners cannot hear any speech signals spoken by the speaker, that is, the walkie-talkie devices of the second and third listeners both detect the CTCSS tone signal related to the received speech signals for actuating a signal squelch function. To sum up, only the users using the same logical channel can communicate with each other to achieve group communication.

Figure 2:
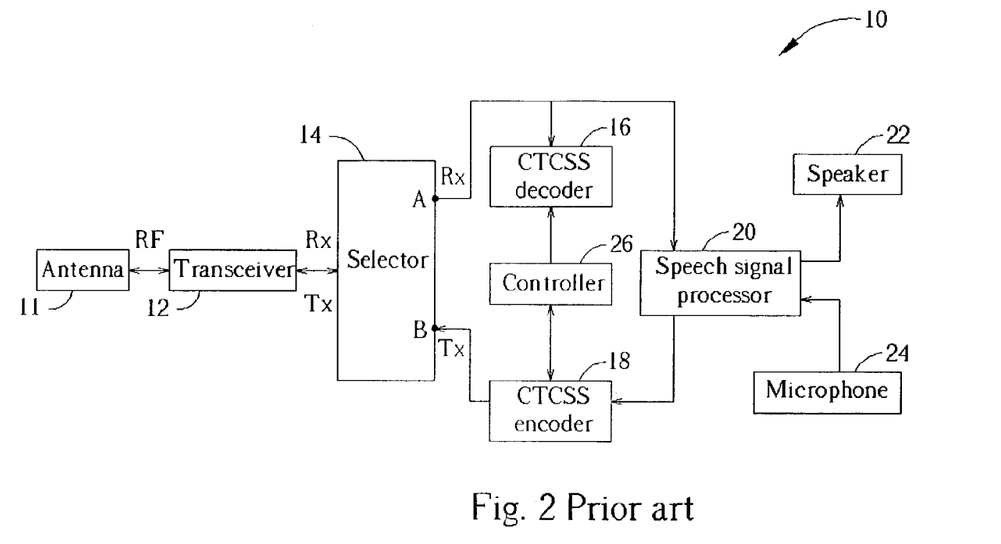
FIG. 2 is a block diagram of a prior art walkie-talkie device.

Please refer to FIG. 2, which is a block diagram of a prior art walkie-talkie device 10. The walkie-talkie device 10 has an antenna 11, a transceiver 12, a selector 14, a CTCSS decoder 16, a CTCSS encoder 18, a speech signal processor 20, a speaker 22, a microphone 24, and a controller 26. The walkie-talkie device 10 can receive and transmit radio frequency (RF) signals through the antenna 11. With regard to receiving RF signals, the transceiver 12 converts the high-frequency RF signal into a low-frequency baseband signal Rx, and transmits the baseband signal Rx to the selector 14. The selector 14 then outputs the baseband signal Rx from an output port A. The CTCSS decoder 16 determines frequency of a CTCSS tone signal according to the received baseband signal Rx. Generally speaking, the CTCSS decoder 16 has a low-pass filter (LPF) for extracting signals with frequencies ranging from 62.5 Hz to 250 Hz, and then the CTCSS decoder 16 judges the CTCSS tone signal related to the baseband signal Rx to decide whether the walkie-talkie device 10 and the baseband signal Rx use the same logical channel. At the same time, the decoder 16 sends a judgment result to the controller 26. If the walkie-talkie device 10 and the baseband signal Rx use the same logical channel, the controller 26 activates the speaker 22 to proceed following signal output operation. That is, the speech signal processor 20 has two analog filter circuits for extracting signals with frequencies ranging from 300 Hz to 3.4 KHz, and the extracted signals are played by the speaker 22. On the contrary, if the walkie-talkie device 10 and the baseband signal Rx use different logical channels, the controller 26 does not actuate the speech signal processor 20 and the speaker 22. The walkie-talkie device 10, therefore, does not output any speech signals transmitted by unmatched logical channels. With regard to transmitting RF signals, when the user presses the PTT button, the selector 14 will chose the input port B, and the controller 26 simultaneously actuates the microphone 24. Therefore, the speech signals spoken by the user are inputted into the speech signal processor 20. As mentioned above, the speech signal processor 20 uses filter circuits to extract signals with frequencies ranging from 300 Hz to 3.4 KHz, and the speech signal processor 20 outputs the extracted signals to the CTCSS encoder 18. Based on a CTCSS code (CTCSS tone signal with a specific frequency) set in the walkie-talkie device 10, the CTCSS encoder 18 adds a corresponding CTCSS tone signal in the extracted signals outputted from the speech signal processor 20 for forming a baseband signal Tx. In the end, the transceiver 12 converts the low-frequency baseband signal Tx into a high-frequency RF signal, and the RF signal is then outputted via the antenna 11.

The prior art walkie-talkie device 10 utilizes an analog signal processing means. While the antenna 11 receives the analog RF signal and the speaker 22 outputs the analog baseband signal Rx, the related signals are processed by the analog signal processing means to handle the CTCSS tone signal. Similarly, while the microphone 24 receives the analog speech signal and the antenna 11 outputs the analog baseband signal Tx, the related signals are processed by the analog signal processing means as well to handle the CTCSS tone signal. As mentioned above, CTCSS decoder 16 and the speech signal processor 20 both require analog filter circuits to extract desired frequency bands. However, the prior art filter circuit cannot have a sharp filtering quality owing to its hardware characteristic. For example, when 38 different CTCSS tone signals are uniformly distributed within the frequency band ranging from 62:5 Hz to 250 KHz, frequency difference between adjacent CTCSS tone signals is almost equal to 5 Hz. That is, the prior art CTCSS decoder 16 might mistake an adjacent CTCSS tone signal for the actual CTCSS tone signal owing to the above-mentioned bad filtering quality so that the reception performance for the desired speech signals is deteriorated. On the other hand, because the speech signal processor 20 cannot precisely extract speech signals with frequencies ranging from 300 Hz to 3.4 KHz, the CTCSS tone signal generated by the CTCSS encoder 18 is probably interfered with by the speech signals generated from the user. In addition, speech signals having frequencies greater than 3.4 KHz will be leak out and interfere with signals transmitted by other physical channels. Therefore, signal transmission for other users is greatly jammed by unwanted noises. When the walkie-talkie device 10 wants to provide the user with additional functions such as the signal scrambling, corresponding hardware circuits have to be added to the original walkie-talkie device 10. The hardware complexity and production cost are increased, and even the size and weight of the product are increased to weaken its competitiveness on the walkie-talkie market.

SUMMARY OF INVENTION

It is therefore a primary objective of the claimed invention to provide a signal processing method of a walkie-talkie device, which utilizes a digital signal processing means to perform the filtering operation on transmitted signals and received signals.

According to the claimed invention, a signal processing method of a wireless communication device is disclosed. The wireless communication device uses a continuous tone-coded squelch system (CTCSS) for controlling transmission of signals. The wireless communication device has an analog-to-digital converter (ADC), a digital signal processor (DSP) electrically connected to the ADC, and a digital-to-analog converter (DAC) electrically connected to the DSP. The signal processing method includes using the ADC for converting a first analog communication signal into a first digital communication signal, the first digital communication signal in frequency domain having a plurality of processing signals, each processing signal corresponding to a predetermined frequency; using the DSP for processing a CTCSS tone signal corresponding to the first digital communication signal and generating a second digital communication signal; and using the DAC for converting the second digital communication signal into a second analog communication signal. The wireless communication device uses the CTCSS tone signal to discriminate a required speech signal from other speech signals transmitted by the same physical communication channel.

It is an advantage over the prior art that the claimed invention utilizes a digital signal processing means. Therefore, a digital filtering process inevitably has a better filtering characteristic. The digital filtering process can precisely extract out signals within one frequency band ranging from 62.5 Hz to 250 Hz and signals within another frequency band ranging from 300 Hz to 3.4 KHz. That is, the detection for the CTCSS tone signal is more accurate, and the reception for the speech signals is clearer. In addition, the claimed walkie-talkie device adopts a digital signal processor, and the claimed walkie-talkie device, therefore, is capable of expanding its functions easily by adjusting appropriate program codes stored in a ROM without modifying any actual hardware elements inside the claimed walkie-talkie device. To sum up, the claimed walkie-talkie device is easily implemented to have desired functions, and has a low production cost.

These and other objectives of the claimed invention will no doubt become obvious to those of ordinary skill in the art after reading the following detailed description of the preferred embodiment, which is illustrated in the multiple figures and drawings.

DETAILED DESCRIPTION

Figure 3:
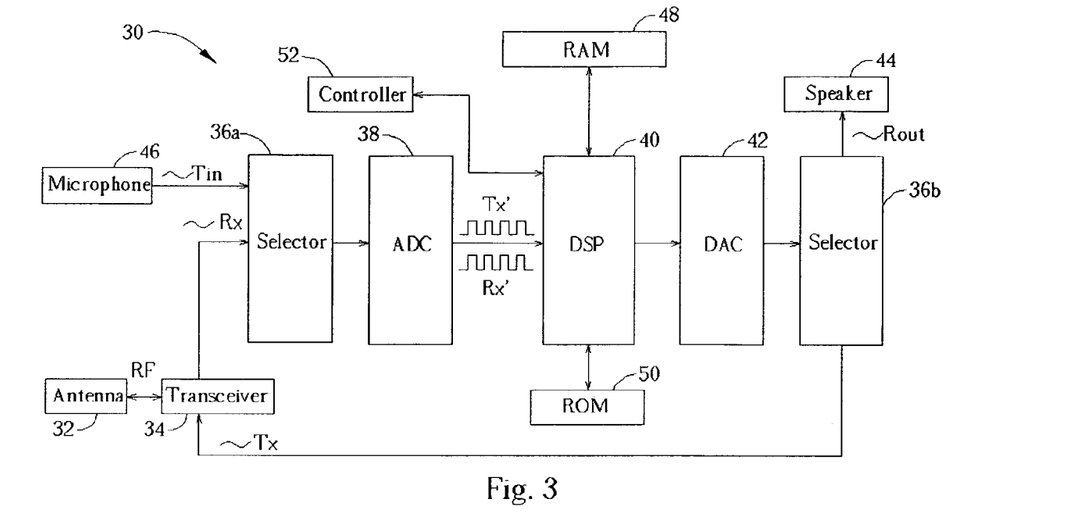
FIG. 3 is a block diagram of a walkie-talkie device according to the present invention.

Please refer to FIG. 3, which is a block diagram of a walkie-talkie device 30 according to the present invention. The walkie-talkie device 30 has an antenna 32, a transceiver 34, two selectors 36a, 36b, an analog-to-digital converter (ADC) 38, a digital signal processor (DSP) 40, a digital-to-analog converter (DAC) 42, a speaker 44, a microphone 46, a random access memory (RAM) 48, a read-only memory (ROM) 50, and a controller 52. The antenna 32 is used to receive RF signals transmitted via a specific physical channel, and is used to output RF signals through the specific physical channel. The transceiver 34 is capable of converting the received high-frequency RF signals into low-frequency baseband signals Rx. In addition, the transceiver 34 is capable of converting the low-frequency signals Tx into high-frequency RF signals, and the converted RF signals are then outputted from the antenna 32. The selectors 36a, 36b are used to dominate transmission paths according to current operating status (signal outputting or signal transmitting). The ADC 38 is used to convert an analog signal into a corresponding digital signal. On the contrary, the DAC 42 is used to convert a digital signal into a corresponding analog signal. DSP 40 is used to process the well-known CTCSS tone signal to check out the logical channel related to the received baseband signal Rx, and is used to make the outputted baseband signal Tx correspond to the logical channel defined by the walkie-talkie device 30. The ROM 50 is used to keep the necessary programs used by the DSP 40 to perform the above-mentioned operations. In addition, the RAM 48 is used to temporarily store data generated during execution of the programs. That is, the RAM 48 functions as a buffer. The controller 52 (a microprocessor for example) is used to control overall operation of the walkie-talkie device 30, and provides the user with a man-machine interface (MMI) so that the user can easily operate the walkie-talkie device 30 and can quickly know current operating status of the walkie-talkie device 30 through the MMI.

The operation of the claimed walkie-talkie device 30 is described as follows. Suppose that the user sets the walkie-talkie device 30 to use a physical channel $P_1$ and a CTCSS tone signal $T_1$, that is, a logical channel $P_1$ ($T_1$). With regard to receiving signals, the antenna 32 receives RF signals, and transmits the received RF signals to the transceiver 34. The transceiver 34 then extracts the desired RF signal through the physical channel, and converts the RF signal into a low-frequency baseband signal Rx. With the help of the selector 36a, the analog baseband signal Rx is transmitted to the ADC 38 to be converted into a corresponding digital signal Rx". The digital signal Rx" is processed by the DSP 40 to detect the wanted CTCSS tone signal $T_1$. That is, the DSP 40 is capable of performing an operation that was previously executed by the CTCSS decoder 16 shown in FIG. 2. If the baseband signal Rx contains the wanted CTCSS tone signal $T_1$, the DSP 40 will inform the controller 52 that the baseband signal Rx should be outputted. At the same time, the DAC 42 converts the digital baseband signal Rx" into a corresponding analog signal Rout, and then the selector 36b feeds the speaker 44 with the analog signal Rout for playing the analog signal Rout. On the other hand, if the baseband signal Rx does not contain the wanted CTCSS tone signal $T_1$ the DSP 40 will inform the controller 52 that the received baseband signal Rx should be ignored. With regard to outputting signals, the user generates an analog signal Tin with the help of the microphone 46, and the analog signal Tin is then inputted into the ADC 38 via the selector 36a. The ADC 38 further converts the analog signal Tin into a corresponding digital signal Tx". Then, the DSP 40 adds the CTCSS tone signal $T_1$ adopted by the walkie-talkie device 30 to the digital signal Tx". That is, the DSP 40 is capable of performing an operation that is previously executed by the CTCSS encoder 18 shown in FIG. 2. In addition, the DAC 42 converts output of the DSP 40 into an analog baseband signal Tx. With the help of the selector 36b, the baseband signal Tx is transmitted to the transceiver 34 to be converted into RF signal corresponding to the physical channel $P_1$. In the end, the RF signal is outputted through the antenna 32.

Figure 4:
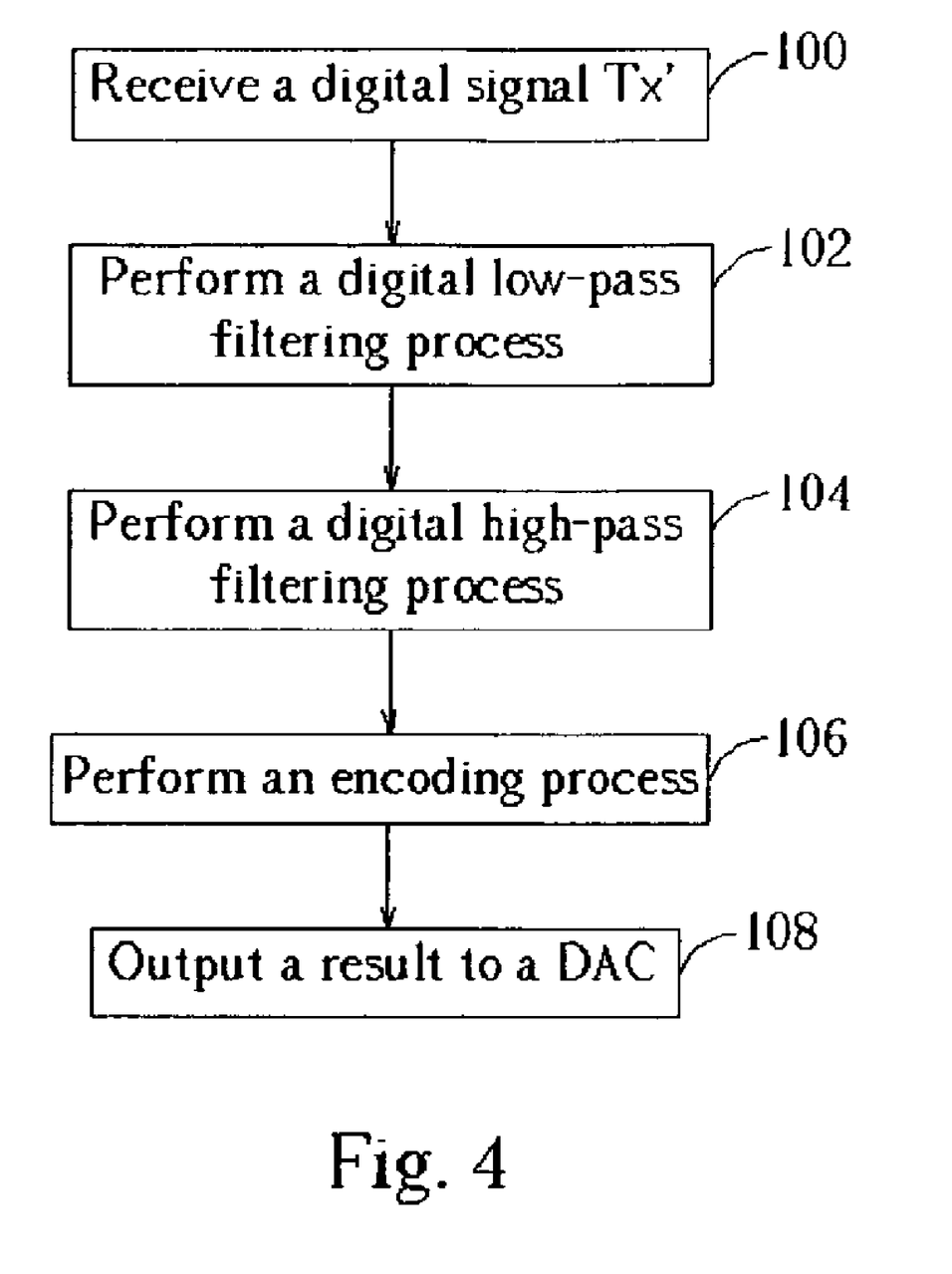
FIG. 4 is a first signal processing flow chart of a digital signal processor shown in FIG. 3.
Figure 5:
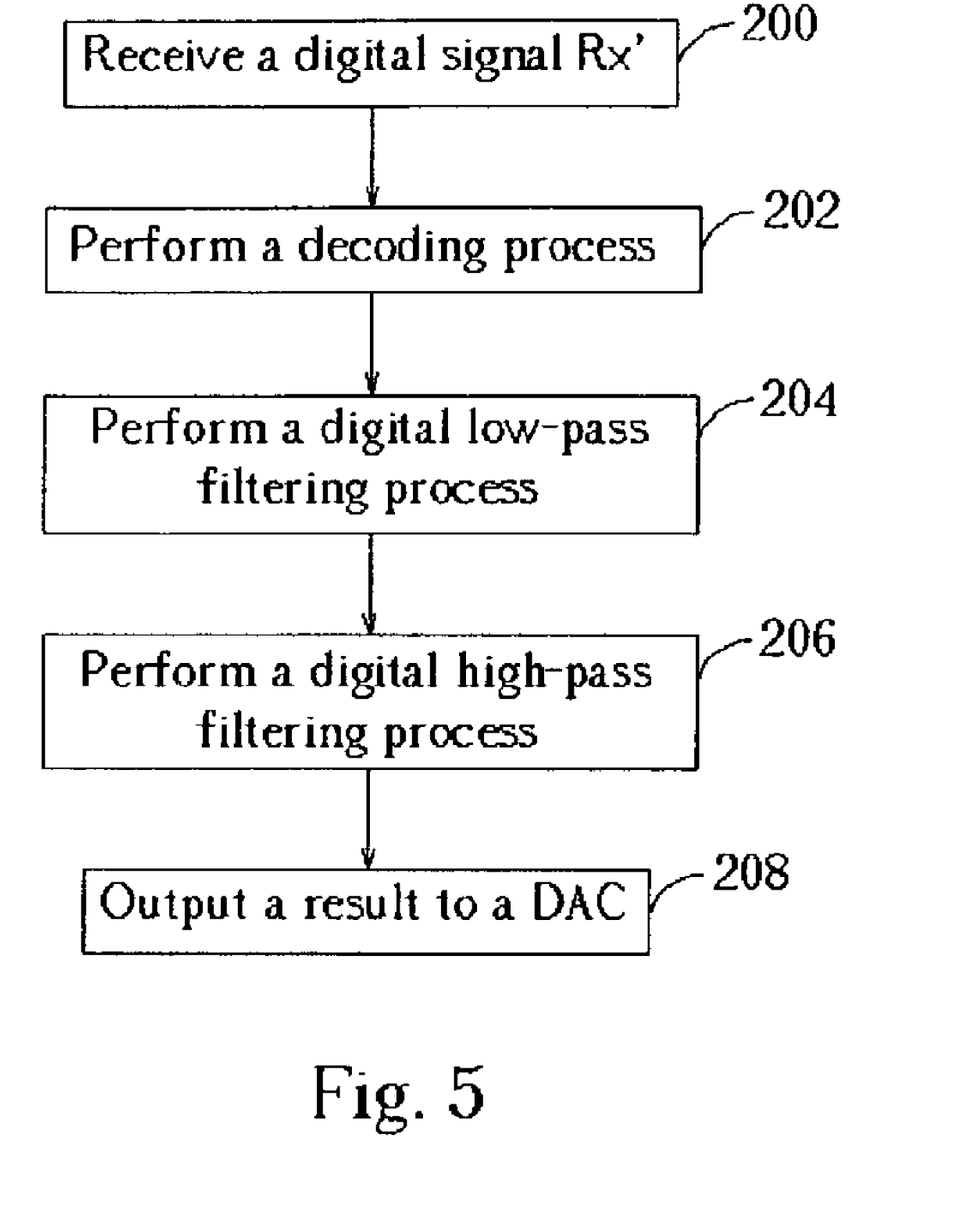
FIG. 5 is a second signal processing flow chart of the digital signal processor shown in FIG. 3.

Please refer to FIG. 4 in conjunction with FIG. 5. FIG. 4 is a first signal processing flow chart of the DSP 40 shown in FIG. 3, and FIG. 5 is a second signal processing flow chart of the DSP 40 shown in FIG. 3. As mentioned above, the DSP 40 retrieves the programs stored in the ROM 50 for performing related operation on the CTCSS tone signals of the digital signals Rx", Tx". For the digital signal Tx", the related operation performed by the DSP 40 includes following steps.

Step 100: Receive the digital signal Tx"

Step 102: Perform a digital low pass filtering process on the digital signal Tx";

Step 104: Perform a digital high-pass filtering process on the digital signal Tx";

Step 106: Perform an encoding process on the digital signal Tx" for adding a CTCSS tone signal; and Step 108: Output a result to the DAC 42.

The above operation is explained as follows. As shown in FIG. 1, the user only can use the frequency band ranging from 300 Hz to 3.4 KHz for transmitting speech signals according to specification of the CTCSS. In addition, the frequency band ranging from 62.5 Hz to 250 Hz is utilized by the CTCSS tone signals. After the DSP 40 receives the digital signal Tx" corresponding to the speech signal Tin (step 100), the digital signal Tx" has to go through a filtering process. The digital signal Tx" in frequency domain comprises a plurality of processing signals, and each processing signal corresponds to a predetermined frequency. Therefore, in the digital signal Tx", the processing signals with frequencies ranging from 300 to 3.4 KHz are extracted out first to prevent other unwanted processing signals with frequencies ranging from 62.5 Hz to 250 Hz from interfering with a desired CTCSS tone signal and to prevent other unwanted processing signals with frequencies greater than 3.4 KHz from interfering with signals transmitted by other physical channels. Therefore, the digital signal Tx" first goes through a low-pass filtering process (step 102) whose cut-off frequency is equal to 3.4 KHz. Only the processing signals with frequencies less than 3.4 KHz are kept, and any processing signals with frequencies greater than 3.4 KHz are filtered out. Afterwards, the digital signal Tx" further goes through a high-pass filtering process (step 104) whose cut-off frequency is equal to 300 KHz so that the processing signals with frequencies ranging from 300 Hz to 3.4 KHz are extracted out. With steps 102 and 104, it is sure that the speech signals Tin are transmitted only within the defined frequency band (300 Hz 3.4 KHz). Finally, an encoding process is activated (step 106) to add a CTCSS tone signal corresponding to the logical channel set by the user into the processed digital signal Tx". For the same physical channel, the added CTCSS tone signal is mainly used to distinguish the current digital signal Tx" from other digital signals Tx" with different CTCSS tone signals. The DSP 40 outputs the processed digital signal Tx" to the DAC 42 for generating the corresponding analog signal Tx (step 108).

With regard to the digital signal Rx", the related operation performed by the DSP 40 includes following steps.

Step 200: Receive the digital signal Rx";

Step 202: Perform a decoding process on the digital signal Rx" for detecting a corresponding CTCSS tone signal;

Step 204: Perform a digital low-pass filtering process on the digital signal Rx";

Step 206: Perform a digital high-pass filtering process on the digital signal Rx";

Step 208: Output a result to the DAC 42.

The above operation is explained as follows. As shown in FIG. 1, the frequency band ranging from 62.5 Hz to 250 Hz is reserved for the CTCSS tone signals. After the DSP 40 receives the digital signal Rx" corresponding to the RF signal (step 200), the CTCSS tone signal located with the frequency band (62.5 Hz~250 HZ) has to be checked for determining whether the logical channel used by the digital signal Rx" is identical to the logical channel set by the walkie-talkie device 30. Therefore, a decoding process is then executed to detect the CTCSS tone signal (step 202). As mentioned above, the digital signal Tx" in frequency domain comprises a plurality of processing signals, and each processing signal has a specific frequency. In other words, the decoding process has to extract out the processing signals with frequencies less than 250 Hz. For example, a low-pass filtering process with a cut-off frequency equaling 250 Hz is activated. Then, the CTCSS tone signal located within the defined frequency band (62.5 Hz~250 HZ) is detected for determining whether the logical channel used by the digital signal Rx" is identical to the logical channel set by the walkie-talkie device 30. If the detection succeeds, the digital signal Rx" is further outputted; otherwise, the digital signal Rx" is ignored. As mentioned before, the digital signal Rx" has to go through another filtering process for extracting out the processing signals with frequencies ranging from 300 Hz to 3.4 KHz so that any possible interference generated from other processing signals with frequencies ranging from 62.5 Hz to 250 Hz and other processing signals with frequencies greater than 3.4 KHz is completely prevented. In conclusion, the digital signal Rx" first goes through a digital low-pass filtering process (step 204) whose cut-off frequency equals 3.4 KHz so as to kept the processing signals with frequencies less than 3.4 KHz and to filter out the processing signals with frequencies greater than 3.4 KHz. Then, a digital high-pass filtering process is started (step 206) for extracting out any processing signals with frequencies ranging from 300 Hz to 3.4 KHz. That is, the cut-off frequency during the high-pass filtering process is equal to 300 Hz. With steps 204 and 206, it is sure that the RF signal received by the antenna 32 are only outputted through the defined frequency band (300 Hz~3.4 KHz). In the long run, the DSP 40 outputs the processed digital signal Rx" to the DAC 42 for generating a corresponding analog signal Rout (step 208).

As mentioned above, the walkie-talkie device 30 according to the present invention applies a digital signal processing means to perform related operation on the CTCSS tone signal located within the analog signal Tin received by the microphone 46 and the analog signal Rx received by the antenna 32. For example, the digital filtering process is performed to extract out the desired processing signals with frequencies located within a predetermined frequency band. Similarly, the CTCSS tone signal is also processed by digital processing means. In other words, the claimed walkie-talkie device 30 utilizes a DSP 40 to execute the programs stored in the ROM 50 for fulfilling the above-mentioned operation. Therefore, if the claimed walkie-talkie device 30 wants to add additional functions, suitable program codes can be placed in the ROM 50. Therefore, it is easy to implement more functions of the claimed walkie-talkie device 30 by storing appropriate programs in the ROM 50. For example, the claimed walkie-talkie device 30 is capable of performing a prior art signal scrambling function only by placing a suitable program in the ROM 50. In the preferred embodiment, any functions of the claimed walkie-talkie device 30 are carried out with the help of programs executed by the DSP 40. However, the claimed walkie-talkie device 30 can also utilize actual hardware circuits to process digital signals for carrying out the functions of the walkie-talkie device 30.

In contrast to the prior art, the claimed walkie-talkie device uses an ADC for converting the analog signals into the digital signals, uses a DSP for performing functions such as signal reception, signal transmission, and signal scrambling, etc., and uses a DAC for converting the processed digital signal into a corresponding analog signal. Compared with the prior art analog filter circuits, digital filtering process inevitably has a better filtering characteristic. The digital filtering process, therefore, can precisely extract out signals within one frequency band ranging from 62.5 Hz to 250 Hz and signals within another frequency band ranging from 300 Hz to 3.4 KHz. In other words, the detection for the CTCSS tone signal is more accurate, and the reception for the speech signals is clearer. In addition, the claimed walkie-talkie device adopts a DSP, and the claimed walkie-talkie device is capable of expanding its functions easily by adjusting appropriate program codes stored in a ROM without modifying any hardware elements inside the claimed walkie-talkie device. To sum up, the claimed walkie-talkie device is easily modified to have desired functions, and has a low production cost.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A signal processing method of a wireless communication device, the wireless communication device using a continuous tone-coded squelch system (CTCSS) for controlling transmission of signals, the wireless communication device comprising an analog-to-digital converter (ADC), a digital signal processor (DSP) electrically connected to the ADC, and a digital-to-analog converter (DAC) electrically connected to the DSP; the signal processing method comprising:

using the ADC for converting a first analog communication signal into a first digital communication signal, the first digital communication signal in frequency domain having a plurality of processing signals, each processing signal corresponding to a predetermined frequency;

using the DSP for processing a CTCSS tone signal corresponding to the first digital communication signal and generating a second digital communication signal; and using the DAC for converting the second digital communication signal into a second analog communication signal;

wherein the wireless communication device uses the CTCSS tone signal to discriminate a required speech signal from other speech signals transmitted by the same physical communication channel.

2. The signal processing method of claim 1 wherein the wireless communication device further comprises:

a program memory electrically connected to the DSP for storing at least a predetermined program; and a data memory electrically connected to the DSP for storing processing data corresponding to the predetermined program;

wherein the DSP reads the predetermined program through the program memory, and accesses the data memory while executing the predetermined program.

3. The signal processing method of claim 2 wherein the program memory is a read-only memory (ROM).

4. The signal processing method of claim 2 wherein the data memory is a random access memory (RAM).

5. The signal processing method of claim 1 further comprising:

using the DSP for extracting processing signals from the first digital communication signal which correspond to a predetermined frequency band in frequency domain.

6. The signal processing method of claim 5 wherein the step of extracting processing signals comprises:

reserving the processing signals in the first digital communication signal whose frequencies are greater than a first cut-off frequency; and reserving the processing signals in the first digital communication signal whose frequencies are less than a second cut-off frequency;

wherein the first cut-off frequency is greater than the second cut-off frequency.

7. The signal processing method of claim 6 wherein a frequency of the CTCSS tone signal is less than the second cut-off frequency.

8. The signal processing method of claim 5 further comprising:

using the DSP for generating the CTCSS tone signal and synthesizing the CTCSS tone signal with the processing signals corresponding to the predetermined frequency band to generate the second digital communication signal.

9. The signal processing method of claim 5 further comprising:
using the DSP for detecting whether the CTCSS tone signal corresponding to the first digital communication signal is identical to a predetermined CTCSS tone signal;
wherein if the CTCSS tone signal corresponding to the first digital communication signal is identical to the predetermined CTCSS tone signal, the DSP generates the second digital communication signal; otherwise, the DSP ignores the first digital communication signal.

10. The signal processing method of claim 1 wherein the wireless communication device is a walkie-talkie.

* * * * *